United States Patent [19]

Manabe et al.

[11] Patent Number: 4,791,798
[45] Date of Patent: Dec. 20, 1988

[54] APPARATUS FOR PRODUCING BASE MATERIAL FOR ALUMINUM FOIL

[75] Inventors: Tsuguichi Manabe; Kohei Takase, both of Niihama, Japan

[73] Assignee: Sumitomo Heavy Industries, Ltd., Tokyo, Japan

[21] Appl. No.: 52,648

[22] Filed: May 20, 1987

[30] Foreign Application Priority Data

May 21, 1986 [JP] Japan ................. 61-114665

[51] Int. Cl.⁴ .................. B21B 1/30; C21D 8/02; C21D 9/60
[52] U.S. Cl. ........................... 72/202; 72/203; 148/11.5 A
[58] Field of Search ............ 72/203, 202, 13, 234, 72/200, 204; 148/11.5 A

[56] References Cited

U.S. PATENT DOCUMENTS 3,587,268  6/1971  Bricmont et al. .................. 72/13
4,405,386  9/1983  Mravic et al. .................. 148/11.5 A
4,407,486  10/1983  Mills et al. .................. 72/202 X Primary Examiner—Robert L. Spruill
Assistant Examiner—Steven B. Katz
Attorney, Agent, or Firm—Armstrong, Nikaido, Marmelstein & Kubovcik

[57] ABSTRACT

The apparatus has a hot roughing mill, a cold finish rolling mill arranged downstream of the hot roughing mill as viewed in the direction of flow of the material, and a slitting/annealing equipment arranged downstream of the finish rolling mill as viewed in the direction of flow of the material. The slitting/annealing equipment includes an uncoiler for uncoiling aluminum web which has been finish-rolled and coiled by the finish rolling mill, a multi-slitter adapted for slitting the uncoiled aluminum web into a plurality of aluminum strips, and an electromagnetic induction heating annealer through which the strips are made to pass so as to be annealed by electromagnetic induction heating.

2 Claims, 2 Drawing Sheets

APPARATUS FOR PRODUCING BASE MATERIAL FOR ALUMINUM FOIL

BACKGROUND OF THE INVENTION

The present invention relates to a novel apparatus for producing aluminum strips which are used as base materials of aluminum foils.

Broadly, there are two types of known processes for producing aluminum foils. In one of these two types of process, as shown in FIG. 2, an aluminum web is first subjected to hot rough rolling conducted by a hot roughing mill A composed of a hot roughing mill uncoiler 1, a hot roughing roll stand 2 and a hot roughing coiler 3. The roughly rolled aluminum web is then subjected to cold finish rolling effected by a cold finish rolling mill B composed of a cold finish roll uncoiler 4, a cold finish rolling stand 5 and a cold finish rolling coiler 6. The aluminum web after the finish rolling is then annealed in an annealing equipment C having an annealing furnace 7 and the thus annealed web having a substantial width is slit into strips by means of a slitting equipment D composed of an uncoiler 8, a multislitter 9 and a coiler 10, whereby aluminum strips as the base material of aluminum foils are obtained in the form of coils.

In the other type of the known processes, as shown in FIG. 3, the aluminum web is first roughly rolled by a hot roughing mill A followed by cold finish rolling conducted by a cold finish rolling mill B. The cold-rolled aluminum web having a substantial width is then slit into strips by a slitting equipment D and the thus obtained strips are annealed through an annealing equipment C having an annealing furnace, whereby aluminum strips as the base material of aluminum foils are obtained.

These two types of known processes, however, suffer from the following disadvantages. Namely, in the process explained in connection with FIG. 2 in which the aluminum web is slit into strips after annealing, the aluminum web when slit exhibits a high level of ductility on the order of 3 to 7 kg/mm$^2$ in terms of tensile strength, so that widthwise edges of each strip obtained through the slitting tend to exhibit thicknesswise protrusion or burrs 14 (see FIG. 6) as a result of contact between these edges and side surfaces of the slitting blades or separators which are adapted for guiding the strips after the slitting. In consequence, each strip coiled on the coiler exhibits a bell-like form with both widthwise ends expanded radially outwardly, as indicated at 22 in FIG. 4. Various attempts have been made to obviate this problem. For instance, an attempt has been made to employ an ironing roll downstream of the slitter and adapted for forcibly depressing the protrusions on both widthwise ends of the strip. In another attempt, the distance between adjacent slitting blades are increased so as to suppress any tendency for each strip to be bent along both widthwise ends thereof, which tendency being often observed when the distance between adjacent blades is small. In still another attempt, the strip is formed such that, as shown in FIG. 5, the burrs project beyond the desired strip width w to be obtained. All these attempts, however, are still unsuccessful.

On the other hand, the second type of the known process features that the aluminum material is annealed after it is slit into a plurality of strips. In this case, almost no bends or burrs are formed on both widthwise ends of each strip, because the aluminum web immediately after cold rolling exhibits a high level of hardness when slit. In this case, however, a number of coiled strips are annealed so that the scale of the annealing equipment has to be increased as compared with the method explained in connection with FIG. 2, with the result that the installation cost is raised and the working time is prolonged due to necessity for handling of a number of strip coils.

SUMMARY OF THE INVENTION

Accordingly, an object of the present invention is to provide a simplified apparatus for producing base material of aluminum foils, which is improved in such a manner as to obviate the above-described drawbacks of the prior art.

To this end, according to the present invention, there is provided an apparatus for producing aluminum strips which are used as the base material of aluminum foils. The apparatus has a hot roughing mill, a cold finish rolling mill arranged downstream of the hot roughing mill as viewed in the direction of flow of the material, and a slitting/annealing equipment arranged downstream of the finish rolling mill as viewed in the direction of flow of the material. The slitting/annealing equipment includes an uncoiler for uncoiling aluminum web which has been finish-rolled and coiled by the finish rolling mill, a multi-slitter adapted for slitting the uncoiled aluminum web into a plurality of aluminum strips, and an electromagnetic induction heating annealer through which the strips are made to pass so as to be annealed by electromagnetic induction heating.

The above and other objects, features and advantages of the present invention will become clear from the following description of the preferred embodiments when the same is read in conjunction with the accompanying drawings.

DESCRIPTION OF THE PREFERRED EMBODIMENT

Figure 1:
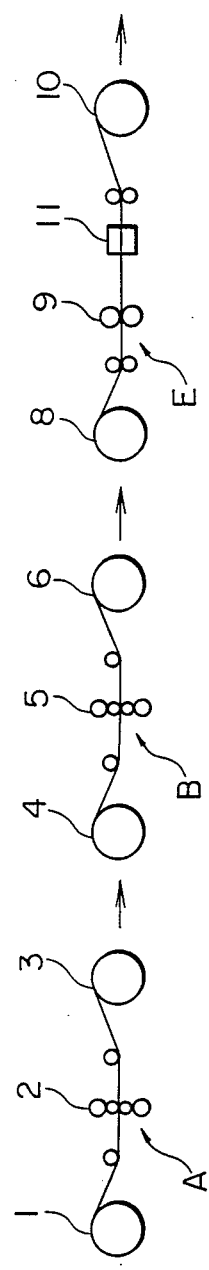
FIG. 1 is an illustration of a production line in accordance with the present invention for producing base material of aluminum foils.
Figure 2:
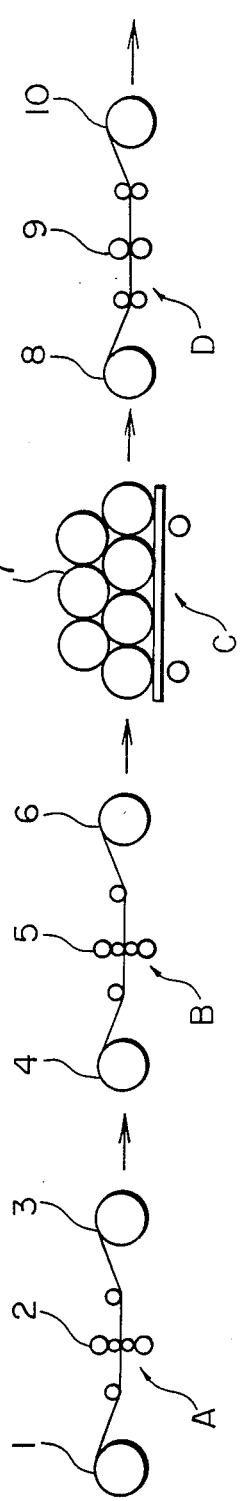
FIG. 2 is an illustration of an example of conventional production lines.
Figure 3:
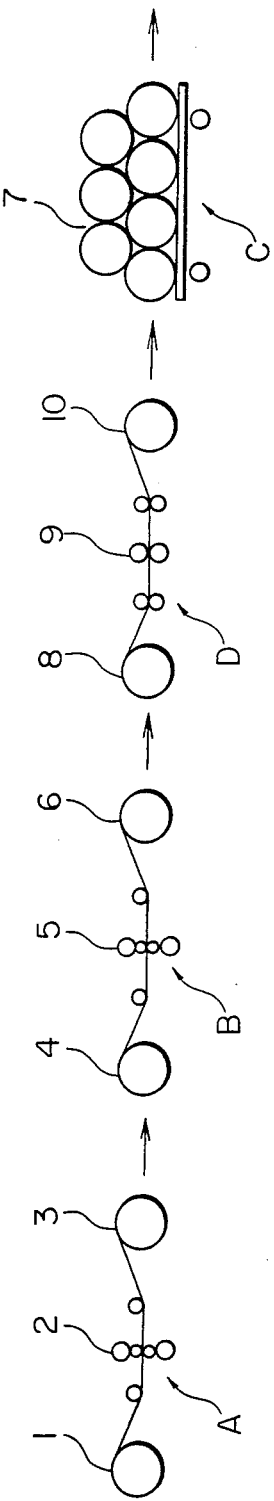
FIG. 3 is an illustration of another example of the conventional production lines.
Figure 4:
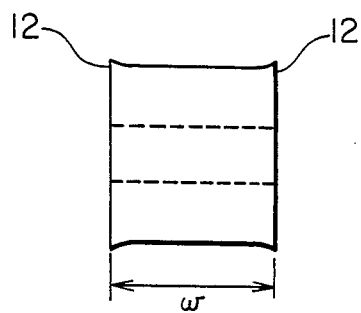
FIG. 4 illustrates the configuration of a coiled strip formed through slitting conducted by a slitter incorporated in the production line shown in FIG. 2.
Figure 5:
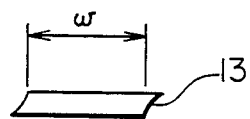
FIG. 5 illustrates burrs formed on both widthwise ends of a strip formed through slitting in the production line shown in FIG. 2.
Figure 6:
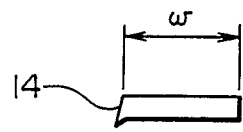
FIG. 6 illustrates a burr formed on one end of a strip formed through slitting in the production line of FIG. 2.

Referring first to FIG. 1, an embodiment of the apparatus of the invention for producing a base material for aluminum foils has a hot roughing mill A and cold finishing mill B through which an aluminum web as a row material is passed, as in the case of the conventional production line.

The apparatus also has a slitting/annealing equipment E which is composed of an uncoiler 8, a multislitter 9, an electromagnetic induction heating annealer 11, and a coiler 10. The electromagnetic induction heating annealer 11 may be of the same type as that disclosed in the specification of U.S. patent Ser. No. 872573, now U.S. Pat. No. 4,678,883.

The aluminum web from the uncoiler 8 is slit into strips by the multi-slitter 9 and is then annealed by the electromagnetic induction heating annealer 11. Thus, the strips are coiled after annealing by the electromagnetic induction heating annealer incorporated in the slitting/annealing equipment E.

As will be understood from the foregoing description, according to the invention, it is possible to eliminate the necessity for large-scale annealing equipment because the annealing is successfully effected by the electromagnetic induction heating annealer which is incorporated in the slitting/annealing equipment. In consequence, the construction of the whole apparatus is remarkably simplified and the cost of production of the base material for aluminum foil is appreciably lowered, with the result that the requirement for the operation of aluminum foil production line becomes less severe.

What is claimed is:

1. An apparatus for producing aluminum strips which are used as the base material of aluminum foils, said apparatus comprising: a hot roughing mill, a cold finish rolling mill arranged downstream of said hot roughing mill; and a slitting and annealing apparatus comprising an uncoiler for uncoiling aluminum web which has been finished-rolled and coiled by said finish rolling mill, a multislitter for slitting the uncoiled aluminum web into a plurality of aluminum strips and an annealer disposed downstream of and in line with said multi-slitter for annealing said slitted aluminum strips continuously passing therethrough.

2. An apparatus as set forth in claim 1, wherein said annealer is an electromagnetic induction heating annealer through which said strips are made to pass so as to be annealed by electromagnetic induction heating.

* * * * *